Sept. 14, 1937.  S. COHN  2,092,832
METHOD OF MAKING MOLDS
Filed May 1, 1936
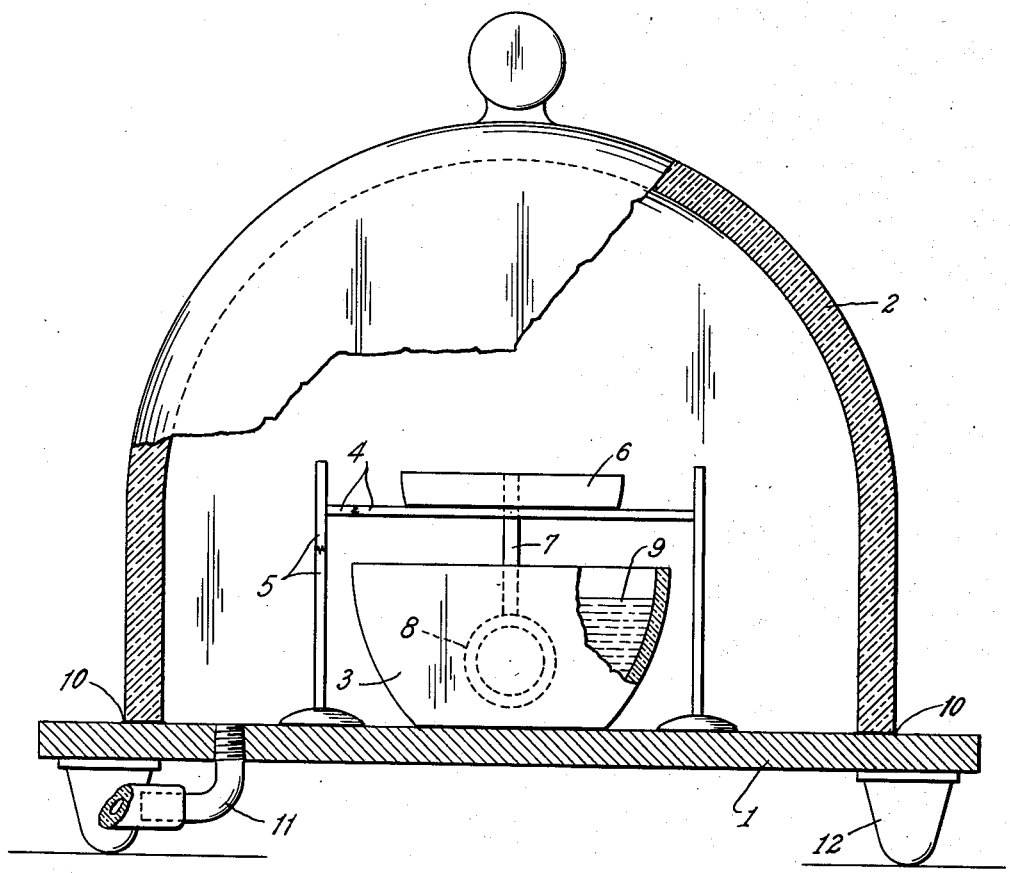
INVENTOR.
Sigmund Cohn
BY
Wm. J. Herdman
ATTORNEY.

Patented Sept. 14, 1937

2,092,832

UNITED STATES PATENT OFFICE 2,092,832

METHOD OF MAKING MOLDS

Sigmund Cohn, New York, N. Y.

Application May 1, 1936, Serial No. 77,305

2 Claims. (Cl. 22—193)

My invention relates to making molds and pertains in particular to methods for making molds from refractory mold, or, as it is called, investment material, while the same is in a liquid condition.

One of the objects contemplated by my invention comprises producing a mold free from indentations caused by air bubbles.

Another object comprises producing a mold in which the investment material is caused to conform exactly to all of the surfaces of the pattern.

A further object comprises producing a mold in which the investment material is caused to uniformly cover every portion of the surface of the pattern.

A still further object comprises producing a mold in which the investment material is rendered uniformly dense to ensure that the smooth surfaces of the resulting casting shall not be marred by undesired surface irregularities and in which the casting will conform in all particulars to the pattern.

In molding, especially small objects of irregular shape, intricate in design or surface ornamentation, the pattern from which the object to be cast is usually made of wax or some similar material with a fairly low volatilization point. To ensure that the mold or investment material will conform to the irregular shapes and intricate designs of the pattern it is usually applied in a liquid or paste condition. The consistency of the investment material is usually that of paint in order that it may flow into all indentations of the pattern and produce a mold in exact replica of the pattern. Great difficulty has been experienced in eliminating undesirable projections in the surface of the casting caused by air bubbles adhering to the pattern and many expedients have been resorted to to avoid this difficulty. The investment material or composition has been applied to the pattern by brushing the material on in one or several coats. The investment material has been stirred by a smooth stirring motion, extreme care being exercised not to lift any of the investment material out of the container and pour it back. Mechanical vibrators have been utilized by which it was hoped to cause the entrapped air to rise to the surface of the material before it set. The investment has sometimes been made under pressure in an endeavor to avoid the difficulty caused by occluded and entrapped air.

I have found that one of the chief sources of undesirable air bubbles resides in occluded air in the investment material. This air may be in the material, in the form of one or more large bubbles, or it may be dispersed throughout the mass in a series of minute bubbles or pockets. I have discovered and successfully demonstrated that if the investment material while in a liquid condition is subjected to a vacuum process to remove the occluded air prior to the investment of the pattern in or with the material and again subjected to a vacuum process during or immediately after the investment of the pattern, the bubbles of air are entirely eliminated to ensure the elimination of undesired irregularities on the castings made in such molds.

I accomplish all of the above noted desirable objects and features and others which will hereafter be apparent by the process described herein with reference to the accompanying drawing which is a partially sectioned elevation of a simple form of apparatus for carrying out my process.

In carrying out my process, well known powdered refractory material, usually having a plaster of Paris or similar base which hardens or sets after being mixed with a liquid, is rendered liquid by the addition of a suitable liquid such as water and stirred to the consistency of paint. It is thereafter placed, as shown in the drawing, in a container 3 and under a bell jar 2 maintained in the usual air-tight manner by wax or grease gasket 10 on a smooth plate 1 supported by legs 12. The air or gas is withdrawn from the bell jar 2 by means of any well known type of vacuum pump, not shown in the drawing, the inlet of which is shown at 11, and as the air is withdrawn the investment material 9 swells and rises in the container 3 as though the occluded air had formed one large bubble. After the air is withdrawn from the material, the material settles down and starts to bubble due to the vaporization of some of the water under the degree of vacuum applied at the ambient temperature. The vacuum is maintained until the surface of the investment material becomes quiescent at the degree of vacuum applied. The bell jar is then removed and the wax pattern 8 with its attached sprue 7 to which is attached a sprue support 6, is supported over the container 3 holding the investment material 9, from which the air has been removed, by means of the supports 4 and 5. Only one pair of the supports is shown in full, the other pair being indicated at the broken sections of the pair shown. The pattern and sprue are introduced into the material and the bell jar is immediately sealed on the smooth plate and the vacuum again applied. As the pattern and the sprue sink into the investment material, any entrapped air is removed and when the surface of the investment becomes quiescent the bell jar is removed and the pattern and sprue bearing a coating or investment is lifted from the investment material. The coating thus applied is permitted to harden.

If desired, this process may be repeated to provide several coatings of investment material. This coating is usually called a primary investment. After the primary investment has hardened, the invested pattern and sprue are invested in mold material held usually in a metallic flask. This mold material is likewise in a liquid condition and is usually of the same composition as that used for the primary investment. This is usually called the secondary investment. The secondary investment may, if desired, be subjected also to the vacuum process as described in connection with the primary investment. After the secondary investment material hardens, the mold containing the invested pattern is subjected to sufficient heat to volatilize the pattern and sprue and the mold is then ready to receive the metal from which the casting is to be made.

I have found that in the case of some patterns, castings conforming faithfully to the pattern may be made by so carefully investing the pattern in investment material, from which the occluded air has been removed, as herein described, as to avoid entrapped air and thus eliminate the necessity for repeating the vacuum process while the pattern is being invested. In this case, the investment material is permitted to harden and thereafter subjected to sufficient heat to volatilize the pattern material and sprue.

It will be apparent from the foregoing that as my process removes not only all occluded air from the investment material, but any air which may be entrapped between the pattern and the investment, the resultant mold more faithfully represents the irregularities and intricacies of design and ornamentation of the pattern and that the investment material being naturally rendered denser by the vacuum process ensures that smooth surfaces of the pattern will not be marred by irregularities caused by air bubbles to thus provide a more effective and efficient method of making molds for casting patterns of irregular outline or of intricate design or surface ornamentation.

Although I have fully described and disclosed my invention by way of one embodiment only as an example, it will be apparent that various changes may be made without departing from the intended spirit and scope of the invention. I do not desire, therefore, to limit myself to the foregoing except as may be pointed out in the appended claims in which I claim:

1. The method of making molds which comprises, subjecting a quantity of mold material disposed in a liquid condition in a container to a vacuum process to remove substantially all of the occluded air therefrom, after the ebullition caused by such vacuum process has subsided and the quantity of mold material has become quiescent, subjecting said quantity of mold material to atmospheric pressure, slowly and cautiously introducing the pattern into said quantity of mold material while said mold material is maintained under atmospheric pressure, permitting the mold material to harden and finally subjecting the mold and pattern to sufficient heat to volatilize the pattern material.

2. The method of making molds which comprises, subjecting a quantity of mold material disposed in a liquid condition in a container to a vacuum process to remove substantially all of the occluded air therefrom, after the ebullition caused by such vacuum process has subsided and the quantity of mold material has become quiescent, subjecting such mold material to atmospheric pressure, investing the pattern directly into said quantity of mold material while the same is maintained at atmospheric pressure, subjecting the invested pattern to a vacuum process for a time sufficient to remove any air which may have been entrapped between the mold material and the pattern, permitting the mold material to harden and finally subjecting the mold and pattern to sufficient heat to volatilize the pattern material.

SIGMUND COHN.